United States Patent [19]
Stockwell et al.

[11] Patent Number: 5,912,293
[45] Date of Patent: Jun. 15, 1999

[54] AQUEOUS POLYMER DISPERSIONS FOR COATING WOOD

[75] Inventors: John Robert Stockwell, North Yorkshire; John Mark Plonka, West Yorkshire, both of United Kingdom

[73] Assignee: Allied Colloids Limited, West Yorkshire, United Kingdom

[21] Appl. No.: 08/959,168

[22] Filed: Oct. 28, 1997

Related U.S. Application Data

[63] Continuation-in-part of application No. 08/513,392, Aug. 10, 1995, abandoned.

Foreign Application Priority Data

Aug. 18, 1994 [GB] United Kingdom .................. 9416709

[51] Int. Cl.⁶ ..................................................... C08K 5/09
[52] U.S. Cl. .......................... 524/306; 524/317; 524/376; 524/378; 524/812; 524/818; 524/819; 524/820; 524/821; 524/822; 524/823; 524/824
[58] Field of Search .................................... 524/819, 820, 524/822, 824, 818, 821, 823, 812, 306, 317, 376, 378

[56] References Cited

U.S. PATENT DOCUMENTS

| Number | Date | Name | Class |
|---|---|---|---|
| 4,250,070 | 2/1981 | Ley et al. | 524/818 |
| 4,267,091 | 5/1981 | Geelhaur et al. | 524/818 |
| 4,296,226 | 10/1981 | Braun et al. | 524/818 |
| 4,871,594 | 10/1989 | Bister et al. | 524/820 |
| 4,904,724 | 2/1990 | Auchter et al. | 524/460 |
| 4,906,684 | 3/1990 | Say | 524/548 |
| 4,988,762 | 1/1991 | Overbeek et al. | 524/839 |
| 5,070,136 | 12/1991 | Derek et al. | 524/555 |
| 5,102,936 | 4/1992 | Huth et al. | 524/555 |
| 5,308,890 | 5/1994 | Snyder | 524/504 |
| 5,358,998 | 10/1994 | Wendel et al. | 524/820 |
| 5,380,784 | 1/1995 | Usuki et al. | 524/558 |
| 5,414,041 | 5/1995 | Larson et al. | 524/839 |
| 5,432,229 | 7/1995 | Aoki et al. | 524/818 |

*Primary Examiner*—Judy M. Reddick
*Attorney, Agent, or Firm*—David R. Crichton

[57] ABSTRACT

The invention provides an aqueous polymer dispersion in which the copolymer is formed from 70 to 90% by weight alkyl methacrylate provided by 0 to 30% by weight $C_{1-3}$ alkyl methacrylate and 50 to 90% by weight $C_{4-12}$ alkyl methacrylate;

5 to 20% by weight styrene or alkyl styrene;

2 to 10% by weight water soluble ethylenically unsaturated monomer;

0.5 to 4% polyethylenically unsaturated monomer; and 0 to 4% carbonyl containing ethylenically unsaturated monomer. The dispersion of the invention is particularly suitable for incorporation into compositions for coating on wood.

8 Claims, No Drawings

AQUEOUS POLYMER DISPERSIONS FOR COATING WOOD

This application is a continuation-in-part of U.S. application Ser. No. 08/513,392, filed Aug. 10, 1995, now abandoned.

This invention relates to aqueous polymer dispersions that can be applied as lacquers to wood to provide a transparent protective finish.

U.S. Pat. No. 5,070,136 describes aqueous copolymer dispersions wherein the copolymer is formed from 85 to 98.5% by weight of methacrylates, 0.5 to 4% by weight of (meth) acrylic acid, 0.5 to 4% by weight (meth) acrylamide, 0.5 to 4% by weight of an α,β-ethylenically or polyunsaturated compound and 0 to 3% by weight of a carbonyl-containing α,β-ethylenically unsaturated compound. It is stated that the methacrylates are preferably of $C_{1-12}$ monoalcohols. It is stated that n-butyl methacrylate or a mixture of this with up to 25% by weight methyl methacrylate is preferred. Such a mixture is used in three of the four examples in U.S. Pat. No. 5,070,136. We find that if n-butyl methacrylate is used alone (i.e. without the methyl methacrylate), the cured finish can tend to be rather soft.

0.5 to 1 mole (per mole of carbonyl-containing monomer) of a dihydrazide of an aliphatic dicarboxylic acid can be added to the dispersion as an additional cross-linking agent.

A composition suitable for coating wood is provided by formulating the copolymer dispersion with a variety of components, including volatile coalescents. It is necessary to include volatile coalescents in such compositions because the copolymer has a film forming temperature (i.e., MFFT, minimum film-forming temperature) which is sufficiently high that, in the absence of coalescents, a clear film would not easily be obtained. However the necessity to include volatile coalescents is undesirable, especially since some of the materials that are frequently use as coalescents (such as ethyleneglycol butyl ethers) are materials that some regulatory authorities believe should be omitted.

It would therefore be desirable to be able to formulate a copolymer that can be used in a wood finish but which can have a low film forming temperature and which can thus permit the use of a low amount of coalescing agent or the omission of coalescing agent.

In the invention, we provide an aqueous polymer dispersion in which the polymer is formed from 70 to 90% by weight alkyl methacrylate provided by 0 to 30% by weight $C_{1-3}$ alkyl methacrylate and 50 to 90% by weight $C_{4-12}$ alkyl methacrylate;

5 to 20% by weight styrene or alkyl styrene;

2 to 10% by weight water soluble ethylenically unsaturated monomer;

0.5 to 4% polyethylenically unsaturated monomer; and 0 to 4% carbonyl-containing ethylenically unsaturated monomer.

In particular the invention provides an aqueous polymer dispersion comprising a copolymer formed from a monomer blend consisting essentially of 0 to 10% by weight $C_{1-3}$ alkyl methacrylate;

75 to 90% by weight $C_{4-12}$ alkyl methacrylate, wherein the total amount of alkyl methacrylate is from 75 to 90% by weight;

7 to 17% by weight styrene or alkyl styrene;

2 to 10% by weight water-soluble ethylenically unsaturated monomer(s);

0.5 to 4% by weight polyethylenically unsaturated monomer(s); and 0 to 4% by weight carbonyl-containing ethylenically unsaturated monomer(s).

In the invention the total amount of alkyl methacrylate is 70 to 90% by weight, in particular 75 to 90% by weight. This is provided by 0 to 30% by weight, in particular 0 to 10% by weight, $C_{1-3}$ alkyl methacrylate and 50 to 90% by weight, in particular 75 to 90% by weight, $C_{4-12}$ methacrylate. That is to say, the amount of $C_{1-3}$ alkyl methacrylate is 0 to 30% by weight, in particular 0 to 10% by weight, based on the total monomer blend and the amount of $C_{4-12}$ alkyl methacrylate is 50 to 90% by weight, in particular 75 to 90% by weight, based on the total monomer blend, and the total amount of alkyl methacrylate is 70 to 90% by weight, in particular 75 to 90% by weight, based on the total monomer blend.

Other non-interfering monomers may be included in non-interfering amounts but are usually omitted so that the polymer generally consists essentially of the defined monomers.

The alkyl methacrylate is preferably provided entirely by butyl methacrylate or other $C_{4-12}$ alkyl methacrylate. However the methacrylate may be a blend of $C_{1-3}$ alkyl methacrylate with a $C_{4-12}$ alkyl methacrylate. For instance a blend of 5 to 15% methyl methacrylate and 70 to 90% butyl methacrylate may be used. The alkyl can be linear, branched or cyclic. The amount of $C_{1-3}$ alkyl methacrylate is preferably below 10%, often below 5%. The amount of the $C_{4-12}$ alkyl methacrylate is usually above 70%, often 75 or 80% to 90%. Instead of n-butyl methacrylate, other higher alkyl methacrylates that can be used include secondary or tertiary butyl methacrylate, cyclohexyl methacrylate, 2-ethylhexyl methacrylate and lauryl methacrylate.

The monomers also include 5 to 20% by weight styrene or alkyl styrene, such as methyl or ethyl styrene. The amount of the styrene is usually at least 7% but is generally not more than about 15 or 17%. Values of around 10 to 15% by weight are generally best.

It is known that homopolymers of styrene and of methyl methacrylate have similar glass transition temperatures and that the glass transition temperature of a copolymer of monomers including styrene would be expected to be similar to the glass transition temperature of a copolymer of a blend of monomers which is the same except that styrene is replaced by the same amount of methyl methacrylate. There is usually some correlation between the film-forming temperature of a polymer dispersion and the glass transition temperature of the polymer in it and so it would be expected that styrene and methyl methacrylate could be used interchangeably as comonomers with, for instance, butyl methacrylate without significantly altering the film-forming temperature of the dispersion. However we have surprisingly found that the incorporation of styrene in low amounts, usually not more than 15 to 20% by weight maximum, provides a polymer dispersion having a surprisingly low film-forming temperature and yet has good hardness and other physical properties.

In particular, modification of the preferred copolymers shown in U.S. Pat. No. 5,070,136 (formed from a blend of butyl methacrylate and methyl methacrylate) by replacing some or all of the methyl methacrylate by styrene or alkyl styrene results in reduction of the film-forming temperature while retaining the hardness and other desirable physical properties of the polymer and coatings obtained from it. As a result it is possible to reduce the amount of coalescent in the composition without increasing the film-forming temperature and/or it is possible to formulate the composition so that it forms a film at a lower temperature.

The water soluble ethylenically unsaturated monomer that is used can be selected from a variety of soluble ethylenically unsaturated monomers such as ethylenically unsaturated carboxylic acids and (meth) acrylamide. Preferably the monomers are a blend of (meth) acrylic acid and (meth) acrylamide. Thus for instance there is preferably 0.5 to 5% (often 0.5 to 2%) of methacrylic acid or, preferably, acrylic acid or a blend thereof, and 0.5 to 5% (often 0.5 to 2%) of acrylamide. For the best solvent resistance performance in the final coating it is preferred to include 2 to 4%, often around 3%, carboxylic acid, preferably acrylic acid.

The polyethylenically unsaturated compounds are typically diethylenically or triethylenically unsaturated compounds. The compounds should be soluble in the monomer blend. Suitable monomers include divinyl aromatics such as divinyl benzene, diacrylates and dimethacrylates of $C_{2-24}$ diols such as butane diol and hexane diol, divinyl ethylene urea and other divinyl ureas, and diallyl and triallyl compounds such as diallyl phthalate and triallyl isocyanurate. The amount of the polyethylenically unsaturated compound is generally 0.5 to 2.5%. The inclusion of such materials causes cross-linking between the polymer backbones.

The polymer preferably additionally includes 0.5 to 4%, often 0.5 to 3%, of a carbonyl-containing unsaturated monomer. Examples include acrolein, methacrolein, diacetone acrylamide, diacetone methacrylamide, 2-butanone methacrylate and vinyl acetoacetate.

When, as is preferred, such a compound is included (typically in an amount of 1 to 3% by weight) it is preferred to include in the dispersion a dihydrazide which will react with the carbonyl compound to provide additional cross linking. The amount of dihydrazide is generally 0.5 to 1 mole per mole of carbonyl-containing monomer. The dihydrazide is preferably a dihydrazide of an aliphatic dicarboxylic acid, preferably a $C_{4-16}$ dicarboxylic acid. Examples of suitable dihydrazides are adipodihydrazide, glutarodihydrazide and succinodihydrazide.

The polymer dispersion can be made by conventional oil-in-water emulsion polymerisation, typically to a solids content of 20 to 60% by weight, often at least 40%, e.g., 40 to 50%, by weight. The polymerisation can be conducted using conventional optional additives such as emulsifiers, protective colloids and chain transfer agents. Generally the dihydrazide is added after the polymerisation.

A coating composition can be formulated by blending with the polymer dispersion conventional film-forming additives and, generally, the dihydrazide (unless that has previously been incorporated). The conventional film-forming additives generally include film-forming coalescents which are preferably volatile. Preferred coalescents are alkyl esters of polycarboxylic acids, usually dimethyl or diisobutyl or other dialkyl (usually $C_{1-8}$ esters) of dicarboxylic aliphatic acids such as adipic acid and/or glutaric acid and/or succinic acid. Other coalescents which can be used include the alkyl ether and the alkyl ether acetate of propylene glycol or polypropylene glycol, the alkyl group preferably being $C_{1-8}$ alkyl, usually n-butyl. The compositions are preferably free of alkyl ethers and alkyl ether acetates of ethylene glycol and polyethylene glycol (for instance diethylene glycol monoethyl ether) since such materials are unnecessary in view of the preferred film-forming properties obtainable in the invention. The total amount of coalescent used in the invention, based on the coating composition, is generally in the range 1 to 5%, and an advantage of the invention is that good results can be obtained with lower amounts than would otherwise be needed and so typically the amount is not more than 4% and preferably not more than 3% by weight based on the coating composition.

Other conventional additives that can be included in the dispersions include waxes, flattening agents such as silica compounds, dyes, and thickeners. The composition is preferably formulated so that it has high light transmission properties (often above 90%) and gives a substantially clear coating.

The coating composition can, depending upon its manner of formulation, be applied by brushing on to the substrate that is to be coated. This substrate is usually wood. The coated substrate may be dried at room temperature or may be subjected to elevated temperatures (for instance up to 80° C.) in conventional tunnel or other driers. This accelerates the final cross linking and curing of the coating.

The cured coatings are abrasion resistant and so are readily sandable and have good stacking properties and good chemical resistance.

The following are some examples.

EXAMPLE 1

A copolymer dispersion is formed of the following blend of monomers

| | |
|---|---|
| N-Butyl Methacrylate | 78.9% wt |
| Styrene | 12.6% wt |
| Methacrylic Acid | 1.4% wt |
| Acrylic Acid | 1.4% wt |
| Diacetone Acrylamide | 1.9% wt |
| 1,4-Butane Diol Diacrylate | 1.9% wt |
| Acrylamide | 1.9% wt |

1 kg of the copolymer dispersion was formed by providing 437 grams of the monomer blend, in the proportions stated above, and emulsifying this blend in 213 grams water in the presence of 17 grams of a 27% aqueous solution of the sodium salt of sulphated 3 mole ethoxylated $C_{12-14}$ fatty alcohol.

226 grams of water and 17 grams of the same emulsifier solution was warmed in a vessel to 80 to 90° C. and sparged with nitrogen and then adjusted to about 85° C. 3.65 grams of a solution of 2 grams ammonium persulphate in 73 grams water was added to the aqueous solution in the vessel followed by 34 grams of the monomer emulsion. The temperature was allowed to rise by exothermic polymerisation to 88° C. and then cooled to 85° C. and held at this temperature for 15 minutes. The remainder of the monomer emulsion was added over 2.5 hours and the remainder of the initiator solution was added over 3 hours, while maintaining the temperature at about 85° C. When all the additions were complete, the resultant polymer emulsion was maintained at 85° C. for a further 1 hour. The dispersion was cooled below 40° C. and 11 grams adipic dihydrazide was added and stirred until fully dissolved.

The product had the following properties:

| | |
|---|---|
| % Solids | 44.0 |
| pH | 3.9 |
| viscosity (Brookfield RVT) | 100 cps |
| MFFT | 38° C. |

EXAMPLE 2

The procedure of Example 1 was repeated except that the styrene was replaced with methyl methacrylate.

The product had the following properties:

| | |
|---|---|
| % Solids | 44.0 |
| pH | 3.9 |
| viscosity | 50 cps |
| MFFT | 48° C. |

The effect of different coalescents on the minimum film-forming temperature (MFFT) of the products from Examples 1 and 2 was determined.

In particular, coating compositions of each dispersion were formed by blending 79.55 parts by weight of the dispersion with 0.2 parts by weight of a conventional substrate wetting agent and the balance, to 100 parts by weight, being a blend of water and variable amounts of different coalescents. The resultant coating compositions had a solids content of 35% by weight. Three coalescents were tested as follows:

| | |
|---|---|
| A | a mixture of refined dimethyl esters of adipic, glutaric and succinic acids |
| B | propylene glycol n-butyl ether |
| C | propylene glycol n-butyl ether acetate |

The minimum film-forming temperature of the resultant coating compositions formulated with differing amounts of the coalescent was determined and the results are shown in the following tables.

| | M.F.F.T. (° C.) | |
|---|---|---|
| % w/w A | Resin 1 (STY) | Resin 2 (MMA) |
| 0 | 38.0 | 48.0 |
| 1 | 22.5 | 29.5 |
| 2 | 12.0 | 19.0 |
| 3 | 4.55 | 11.50 |
| 4 | 0 | 5.50 |
| 5 | −1.10 | 0.50 |
| 6 | | 0 |

| | M.F.F.T. (° C.) | |
|---|---|---|
| % w/w B | Resin 1 (STY) | Resin 2 (MMA) |
| 0 | 38.0 | 48.0 |
| 1 | 32.8 | 39.0 |
| 2 | 25.0 | 31.0 |
| 3 | 19.0 | 24.0 |
| 4 | 13.0 | 18.5 |
| 5 | 7.5 | 13.0 |
| 6 | 2.5 | 8.0 |
| 7 | −0.5 | 4.0 |
| 8 | | 0.50 |

| | M.F.F.T. (° C.) | |
|---|---|---|
| % w/w C | Resin 1 (STY) | Resin 2 (MMA) |
| 0 | 38.0 | 48.0 |
| 1 | 31.0 | 39.0 |
| 2 | 24.0 | 30.0 |
| 3 | 18.0 | 22.5 |
| 4 | 12.0 | 15.5 |
| 5 | 6.0 | 9.0 |
| 6 | −0.5 | 4.0 |
| 7 | −1.5 | 0.5 |

It is apparent that the compositions of the invention, based on copolymers of butyl methacrylate and styrene, have lower film-forming temperatures than the corresponding compositions formed using methyl methacrylate in place of the styrene. In all instances, the coating compositions dried on wood to form a clear, abrasion-resistant and chemical-resistant protective lacquer coating.

EXAMPLE 3

Similar results to those of Example 1 may be achieved using a blend of monomers as follows:

| | |
|---|---|
| N-Butyl Methacrylate | 80.5% wt |
| Styrene | 12.8% wt |
| Methacrylic Acid | 1.4% wt |
| Diacetone Diol Diacrylate | 1.9% wt |
| Butane Diol Diacrylate | 1.9% wt |
| Acrylamide | 1.4% wt |

We claim:

1. An aqueous polymer dispersion comprising a copolymer formed from a monomer blend consisting essentially of 0 to 10% by weight $C_{1-3}$ alkyl methacrylate;

75 to 90% by weight $C_{4-12}$ alkyl methacrylate, wherein the total amount of alkyl methacrylate is from 75 to 90% by weight;

7 to 17% by weight styrene or alkyl styrene;

2 to 10% by weight water-soluble ethylenically unsaturated monomer(s);

0.5 to 4% by weight polyethylenically unsaturated monomer(s); and 0 to 4% by weight carbonyl-containing ethylenically unsaturated monomer(s).

2. The dispersion according to claim 1 in which the $C_{4-12}$ alkyl methacrylate is butyl methacrylate and the $C_{1-3}$ alkyl methacrylate is methyl methacrylate.

3. The dispersion according to claim 1 in which the water-soluble ethylenically unsaturated monomer(s) is provided by 0.5 to 5% by weight of (meth) acrylic acid and 0.5 to 5% by weight of (meth) acrylamide.

4. The dispersion according to claim 1 in which the carbonyl-containing monomer is present in an amount of 0.5 to 4% by weight.

5. The dispersion according to claim 1 or claim 2 in which the alkyl methacrylate is provided only by $C_{4-12}$ alkyl methacrylate and the amount of styrene is 10 to 15% by weight.

6. The dispersion according to any of claims 1, 2 or 3 suitable for coating on wood and further comprising coalescent.

7. The dispersion according to claim 6 in which the coalescent is selected from the group consisting of dialkyl esters of dicarboxylic acid, alkyl ether of propylene glycol, and alkyl ether acetate of propylene glycol.

8. The dispersion according to claim 4 in which the dispersion further comprises dihydrazide of dicarboxylic acid for cross-linking with the carbonyl monomer.

* * * * *